(12) United States Patent
Zeng

(10) Patent No.: US 11,120,808 B2
(45) Date of Patent: Sep. 14, 2021

(54) AUDIO PLAYING METHOD AND APPARATUS, AND TERMINAL

(71) Applicant: XI'AN ZHONGXING NEW SOFTWARE CO., LTD., Shanxi (CN)

(72) Inventor: Huipeng Zeng, Shenzhen (CN)

(73) Assignee: Xi'an Zhongxing New Software Co., Ltd., Xi'an (CN)

( * ) Notice: Subject to any disclaimer, the term of this patent is extended or adjusted under 35 U.S.C. 154(b) by 0 days.

(21) Appl. No.: 16/798,185

(22) Filed: Feb. 21, 2020

(65) Prior Publication Data

US 2020/0194016 A1 Jun. 18, 2020

Related U.S. Application Data

(63) Continuation of application No. PCT/CN2018/101573, filed on Aug. 21, 2018.

(30) Foreign Application Priority Data

Sep. 8, 2017 (CN) .......................... 201710806127.6

(51) Int. Cl.
*H04S 3/02* (2006.01)
*G10L 19/008* (2013.01)
(Continued)

(52) U.S. Cl.
CPC ............ *G10L 19/008* (2013.01); *G06F 3/162* (2013.01); *H04S 1/007* (2013.01); *H04S 3/008* (2013.01)

(58) Field of Classification Search
CPC .. G10L 19/008; G10L 19/167; H04S 2400/01
(Continued)

(56) References Cited

U.S. PATENT DOCUMENTS 5,946,352 A * 8/1999 Rowlands ............. G10L 19/008
375/242
2010/0235661 A1 9/2010 Lu et al.
(Continued)

FOREIGN PATENT DOCUMENTS

CN 101459717 A 6/2009
CN 102063908 A 5/2011
(Continued)

OTHER PUBLICATIONS

ZTE Corporation, Office Action, CN 201710806127.6, dated Sep. 24, 2020, 6 pgs.
(Continued)

*Primary Examiner* — George C Monikang
(74) *Attorney, Agent, or Firm* — USCH Law, PC

(57) ABSTRACT

The present disclosure provides an audio playing method and apparatus, and a terminal. The method includes: obtaining a combined third pulse code modulation (PCM) code stream according to a first PCM code stream and a second PCM code stream, where information about the first PCM code stream and information about the second PCM code stream are carried in respective channels of the third PCM code stream; inputting the third PCM code stream to a DAC, and outputting the third PCM code stream to a first speaker and a second speaker through the DAC for playback. According to the embodiments of the present disclosure, two audio code streams are combined into one audio code stream, and the information about the two audio code streams are carried in different channels of the combined audio code stream.

15 Claims, 6 Drawing Sheets

(51) Int. Cl.
*G06F 3/16* (2006.01)
*H04S 1/00* (2006.01)
*H04S 3/00* (2006.01)

(58) Field of Classification Search
USPC .................................... 381/22, 23, 307, 119
See application file for complete search history.

(56) References Cited

U.S. PATENT DOCUMENTS

2014/0241558 A1   8/2014  Yliaho et al.
2016/0119733 A1*  4/2016  Vilermo .................... H04S 5/00
                                                 381/17

FOREIGN PATENT DOCUMENTS

| CN | 105679345 A | 6/2016 |
| CN | 106131322 A | 11/2016 |
| CN | 106686211 A | 5/2017 |
| CN | 107040496 A | 8/2017 |
| CN | 108206886 A | 6/2018 |

OTHER PUBLICATIONS

ZTE Corporation, International Search Report / Written Opinion, PCT/CN2018/101573, dated Sep. 27, 2018, 11 pgs.
ZTE Corporation, Extended European Search Report, EP18854656.8, dated Mar. 18, 2021, 10 pgs.

* cited by examiner

AUDIO PLAYING METHOD AND APPARATUS, AND TERMINAL

CROSS-REFERENCES TO RELATED APPLICATIONS

The present application is a continuation of PCT Application No. PCT/CN2018/101573, filed on Aug. 21, 2018, entitled "AUDIO PLAYING METHOD AND APPARATUS, AND TERMINAL", which claims the benefit of priority to Chinese Patent Application No. 201710806127.6, filed on Sep. 8, 2017, the disclosure of each of which is incorporated herein by reference in its entirety.

TECHNICAL FIELD

The present disclosure relates to the technical field of intelligent terminals, and in particular, to an audio playing method and apparatus, and a terminal.

BACKGROUND

A dual-screen smartphone has two screens. In a typical application scenario shown in FIG. 1, two screens are placed in a manner to allow two videos be played simultaneously and on the two screens respectively, so that two persons can watch multimedia content with images, such as movies, at two sides simultaneously. This new experience mode may be enjoyed at home or on a train for traveling or business, providing enhanced user experience with the dual-screens.

A current dual-screen mobile phone, however, has only one audio digital to analog converter (DAC) chip. Therefore, when both multimedia contents played on the screens at the two sides have audio information, the current intelligent device can only mix channels of the videos played on the two screens and play the mixed audio through all speakers. Consequently, users at the two sides cannot clearly recognize the accompanying sound tracks of the respective videos. The interference caused by the videos on the screens at the opposite sides greatly affects user experience.

SUMMARY

The present disclosure provides an audio playing method and apparatus, and a terminal, to solve the existing problems of deteriorated user experience where the users cannot clearly hear the accompanying sound of the respective videos when different videos are simultaneously played on dual screens.

In order to solve the above technical problem, the present disclosure provides an audio playing method. In some embodiments, the method includes:

obtaining a combined third pulse code modulation (PCM) code stream according to a first PCM code stream and a second PCM code stream, where information about the first PCM code stream and information about the second PCM code stream are carried in one of channels of the third PCM code stream, respectively; and inputting the third PCM code stream to a DAC, and outputting the third PCM code stream to a first speaker and a second speaker through the DAC for playing.

According to some embodiments, obtaining the combined third PCM code stream according to the first PCM code stream and the second PCM code stream includes:

superposing left and right channels of the first PCM code stream to obtain first mono data, using the first mono data as a first channel of a first to-be-combined PCM code stream, and setting a second channel of the first to-be-combined PCM code stream to be empty;

superposing left and right channels of the second PCM code stream to obtain second mono data, using the second mono data as a second channel of a second to-be-combined PCM code stream, and setting a first channel of the second to-be-combined PCM code stream to be empty; and combining the first to-be-combined PCM code stream and the second to-be-combined PCM code stream; and obtaining the combined third PCM code stream.

According to some embodiments, obtaining the combined third PCM code stream according to the first PCM code stream and the second PCM code stream includes:

superposing left and right channels of the first PCM code stream to obtain first mono data, using the first mono data as a first channel of a first to-be-combined PCM code stream, obtaining corresponding second PCM code stream attenuation data according to the second PCM code stream, and using the second PCM code stream attenuation data as a second channel of the first to-be-combined PCM code stream;

superposing left and right channels of the second PCM code stream to obtain second mono data, and using the second mono data as a second channel of a second to-be-combined PCM code stream; obtaining corresponding first PCM code stream attenuation data according to the first PCM code stream, and using the first PCM code stream attenuation data as a first channel of the second to-be-combined PCM code stream; and combining the first to-be-combined PCM code stream and the second to-be-combined PCM code stream; and obtaining the combined third PCM code stream.

According to some embodiments, obtaining corresponding second PCM code stream attenuation data according to the second PCM code stream includes: rotating a data phase of the second PCM code stream by 180 degrees, and multiplying the data phase by a preset attenuation coefficient to obtain the second PCM code stream attenuation data; and obtaining corresponding first PCM code stream attenuation data according to the first PCM code stream includes: rotating a data phase of the first PCM code stream by 180 degrees, and multiplying the data phase by a preset attenuation coefficient to obtain the first PCM code stream attenuation data.

According to some embodiments, before obtaining the combined third PCM code stream according to the first PCM code stream and the second PCM code stream, the method further includes:

determining that a first channel corresponding to the first PCM code stream is one of a left(L) channel and a right(R) channel, and determining that a second channel corresponding to the second PCM code stream is the other of the L channel and the R channel, to combine the first PCM code stream and the second PCM code stream according to the determined first and second channels.

According to some embodiments, determining that the first channel corresponding to the first PCM code stream is one of the L channel and the R channel and determining that a second channel corresponding to the second PCM code stream is the other of the L channel and the R channel includes:

finding out, according to an audio code stream, a UID of an application to which the audio code stream belongs; herein, the audio code stream is the first PCM code stream or the second PCM code stream;

determining a corresponding playing screen according to the UID of the application;

determining, according to a correspondence between playing screens and speakers, a speaker corresponding to the audio code stream; and determining, according to a correspondence between speakers and channels, a channel corresponding to the audio code stream.

In order to solve the above technical problem, the present disclosure further provides an audio playing apparatus, disposed on a terminal. The apparatus includes:

a combination unit, configured to obtain a combined third PCM code stream according to a first PCM code stream and a second PCM code stream, where information about the first PCM code stream and information about the second PCM code stream are carried in one of channels of the third PCM code stream, respectively; and an output unit, configured to input the third PCM code stream to a DAC, and output the third PCM code stream to a first speaker and a second speaker through the DAC for playing.

According to some embodiments, the combination unit obtaining the combined third PCM code stream according to the first PCM code stream and the second PCM code stream includes:

superposing left and right channels of the first PCM code stream to obtain first mono data, using the first mono data as a first channel of a first to-be-combined PCM code stream, and setting a second channel of the first to-be-combined PCM code stream to be empty;

superposing left and right channels of the second PCM code stream to obtain second mono data, using the second mono data as a second channel of a second to-be-combined PCM code stream, and setting a first channel of the second to-be-combined PCM code stream to be empty; and combining the first to-be-combined PCM code stream and the second to-be-combined PCM code stream; and obtaining the combined third PCM code stream.

According to some embodiments, the combination unit obtaining the combined third PCM code stream according to the first PCM code stream and the second PCM code stream includes:

superposing left and right channels of the first PCM code stream to obtain first mono data, using the first mono data as a first channel of a first to-be-combined PCM code stream, obtaining corresponding second PCM code stream attenuation data according to the second PCM code stream, and using the second PCM code stream attenuation data as a second channel of the first to-be-combined PCM code stream;

superposing left and right channels of the second PCM code stream to obtain second mono data, and using the second mono data as a second channel of a second to-be-combined PCM code stream; obtaining corresponding first PCM code stream attenuation data according to the first PCM code stream, and using the first PCM code stream attenuation data as a first channel of the second to-be-combined PCM code stream; and combining the first to-be-combined PCM code stream and the second to-be-combined PCM code stream; and obtaining the combined third PCM code stream.

According to some embodiments, the combination unit obtaining corresponding second PCM code stream attenuation data according to the second PCM code stream includes: rotating a data phase of the second PCM code stream by 180 degrees, and multiplying the data phase by a preset attenuation coefficient to obtain the second PCM code stream attenuation data; and the combination unit obtaining corresponding first PCM code stream attenuation data according to the first PCM code stream includes: rotating a data phase of the first PCM code stream by 180 degrees, and multiplying the data phase by a preset attenuation coefficient to obtain the first PCM code stream attenuation data.

According to some embodiments, the combination unit is further configured to determine, before obtaining the combined third PCM code stream according to the first PCM code stream and the second PCM code stream, that a first channel corresponding to the first PCM code stream is one of a left(L) channel and a right(R) channel, and determine that a second channel corresponding to the second PCM code stream is the other of the L channel and the R channel, to combine the first PCM code stream and the second PCM code stream according to the determined first and second channels.

According to some embodiments, the combination unit determining that a first channel corresponding to the first PCM code stream is one of the L channel and the R channel and determining that a second channel corresponding to the second PCM code stream is the other of the L channel and the R channel includes:

finding out, according to an audio code stream, a UID of an application to which the audio code stream belongs; wherein, the audio code stream is the first PCM code stream or the second PCM code stream;

determining a corresponding playing screen according to the UID of the application;

determining, according to a correspondence between playing screens and speakers, a speaker corresponding to the audio code stream; and determining, according to a correspondence between speakers and channels, a channel corresponding to the audio code stream.

In order to solve the above technical problem, the present disclosure further provides a terminal, including a memory, a processor, and a computer program stored on the memory and executable on the processor. When the processor executes the computer program, processing of any of the above audio playing methods is implemented.

In order to solve the above technical problem, the present disclosure further provides a terminal, including any of the above audio playing apparatuses.

Compared with the existing technology, an embodiment as provided in the present disclosure includes: obtaining a combined third PCM code stream according to a first PCM code stream and a second PCM code stream, herein information about the first PCM code stream and information about the second PCM code stream are carried in one of channels of the third PCM code stream, respectively; and inputting the third PCM code stream to a DAC, and outputting the third PCM code stream to a first speaker and a second speaker through the DAC for playing. According to an embodiment of the present disclosure, two audio code streams are combined into one audio code stream, and the information about the two audio code streams are carried in different channels of the combined audio code stream. Different channels of the combined audio code stream are played through different speakers, so that different users can hear accompanying sound of respective videos being watched by the users. The audio playing method is provided without changing an existing hardware structure, thereby improving user experience, especially user experience of concurrent multimedia of a dual-screen mobile phone.

BRIEF DESCRIPTION OF THE DRAWINGS

The following describes the accompanying drawings in the embodiments of the present disclosure. The accompanying drawings in the embodiments are used for further understanding of the present disclosure, and for explaining the present disclosure together with the description, and do not constitute a limitation on the protection scope of the present disclosure.

DETAILED DESCRIPTION

To facilitate the understanding by those skilled in the art, the following further describes the present disclosure with reference to the accompanying drawings, and is not intended to limit the protection scope of the present disclosure. It should be noted that, the embodiments in this application and various manners in the embodiments may be combined with each other in the case of no conflict.

Figure 1:
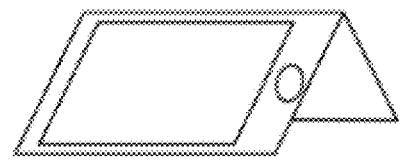
FIG. 1 is a schematic diagram of an application scenario of a dual-screen smartphone in the existing technology.
Figure 2:
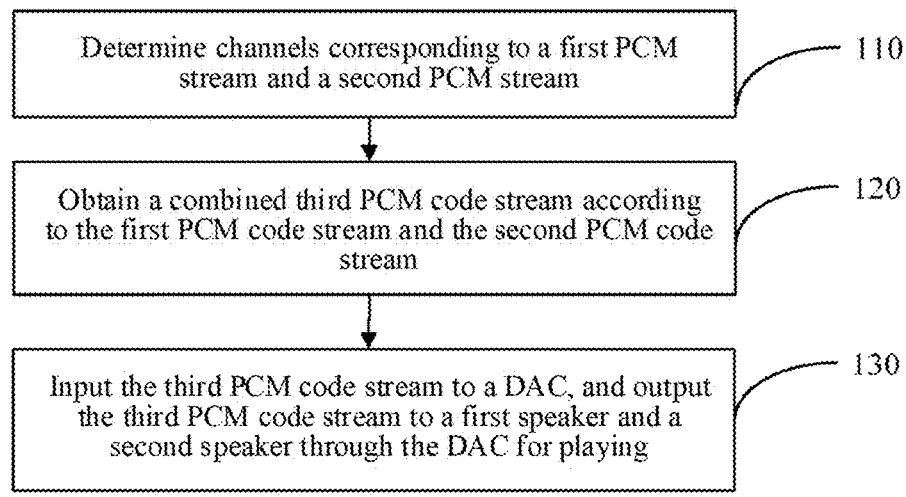
FIG. 2 is a flowchart of an audio playing method according to an embodiment of the present disclosure.

Referring to FIG. 2, the present disclosure provides an audio playing method. The method includes the following steps.

In step 120, a combined third PCM code stream is obtained according to a first PCM code stream and a second PCM code stream. Information about the first PCM code stream and information about the second PCM code stream are carried in one of channels of the third PCM code stream, respectively.

In step 130, the third PCM code stream is input to a DAC, and is output to a first speaker and a second speaker through the DAC for playing.

Figure 3A:
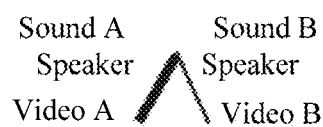
FIG. 3A and FIG. 3B are schematic diagrams of speakers at two sides of a dual-screen mobile phone.
Figure 3B:
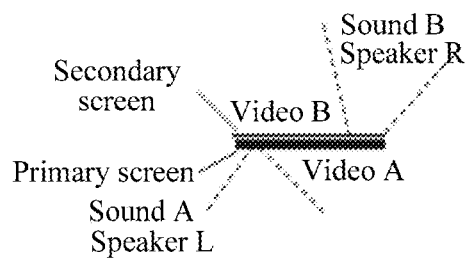

As shown in FIG. 3A and FIG. 3B, a video A and a video B may be played on screens at two sides of a dual-screen mobile phone, respectively. Each of the screens has an own speaker that may be configured to play one channel in an audio code stream. Therefore, an accompanying sound A of the video A is played through the speaker at one side of the video A, and an accompanying sound B of the video B is played through the speaker at one side of the video B. The accompanying sound A and the accompanying sound B are the left(L) channel and the right(R) channel of the combined PCM code stream, respectively. FIG. 3B is a schematic diagram of a speaker L and a speaker R. The speaker L and the speaker R have different sound field ranges and therefore do not affect sound propagation of each other.

Obtaining a combined third PCM code stream according to a first PCM code stream and a second PCM code stream in the step 120 includes:

superposing left and right channels of the first PCM code stream to obtain first mono data, using the first mono data as a first channel of a first to-be-combined PCM code stream, and setting a second channel of the first to-be-combined PCM code stream to be empty;

superposing left and right channels of the second PCM code stream to obtain second mono data, using the second mono data as a second channel of a second to-be-combined PCM code stream, and setting a first channel of the second to-be-combined PCM code stream to be empty; and combining the first to-be-combined PCM code stream and the second to-be-combined PCM code stream to obtain the combined third code stream.

Obtaining a combined third PCM code stream according to a first PCM code stream and a second PCM code stream in the step 120 includes:

superposing left and right channels of the first PCM code stream to obtain first mono data, using the first mono data as a first channel of a first to-be-combined PCM code stream, obtaining corresponding second PCM code stream attenuation data according to the second PCM code stream, and using the second PCM code stream attenuation data as a second channel of the first to-be-combined PCM code stream;

superposing left and right channels of the second PCM code stream to obtain second mono data, and using the second mono data as a second channel of a second to-be-combined PCM code stream; obtaining corresponding first PCM code stream attenuation data according to the first PCM code stream, and using the first PCM code stream attenuation data as a first channel of the second to-be-combined PCM code stream; and combining the first to-be-combined PCM code stream and the second to-be-combined PCM code stream to obtain the combined third code stream.

Obtaining corresponding second PCM code stream attenuation data according to the second PCM code stream includes: rotating a data phase of the second PCM code stream by a predetermined degree, and multiplying the data phase by a preset attenuation coefficient to obtain the second PCM code stream attenuation data.

Obtaining corresponding first PCM code stream attenuation data according to the first PCM code stream includes: rotating a data phase of the first PCM code stream by a predetermined degree, and multiplying the data phase by a preset attenuation coefficient to obtain the first PCM code stream attenuation data. Exemplarily, the predetermined angle is 180 degrees.

In the above embodiment, by using an additional sound field phase interference technology, an anti-interference effect can be enhanced, and audio that is opposed-phase to audio at the opposite side is played at one side to achieve complete noise reduction, thereby completely isolate influence of sound of the other one.

In an embodiment of the present disclosure, before the step 120 of obtaining a combined third PCM code stream according to a first PCM code stream and a second PCM code stream, the method further includes step 110.

In step 110, channels corresponding to the first PCM code stream and the second PCM code stream are determined. That is, it is determined that a first channel corresponding to the first PCM code stream is one of a left(L) channel and a right(R) channel, and it is determined that a second channel corresponding to the second PCM code stream is the other of the L channel and the R channel, to combine the first PCM code stream and the second PCM code stream according to the determined first and second channels.

In an embodiment of the present disclosure, in the step 110, determining that the channel corresponding to the PCM code stream is one of an L channel and an R channel and determining that a second channel corresponding to the second PCM code stream is the other of the L channel and the R channel specifically includes the following steps.

In step 111, a UID of an application to which the audio stream belongs is found out according to an audio code stream. Here, the audio code stream may be the first PCM code stream or the second PCM code stream.

In step 112, a corresponding playing screen is determined according to the UID of the application.

In step 113, a channel corresponding to the audio code stream is determined according to a correspondence between playing screens and channels.

Step 113 may include the following steps.

In step 1131, a speaker corresponding to the audio code stream is determined according to a correspondence between playing screens and speakers.

In step 1132, the channel corresponding to the audio code stream is determined according to a correspondence between speakers and channels.

In addition, in step 113, the correspondence between playing screens and channels may also be preset, so that the channel corresponding to the audio code stream is determined according to the correspondence between playing screens and channels.

In an embodiment of the present disclosure, the first PCM code stream and the second PCM code stream are audio code streams from different applications or from different instances of a same application. In case of two applications, both may be video playing applications, or one is a video application and the other is an audio application, or both are audio applications. In addition, the two applications may be foreground and background applications. In this scenario, it is not necessary for WindowsManager to make a dual-screen judgement, but to make a judgement of foreground and background. For example, one channel may play pure audio such as background music/an audio narration of a novel, and one channel may play an accompanying sound of a foreground video.

Descriptions are given below with reference to specific implementation scenarios.

Figure 4:
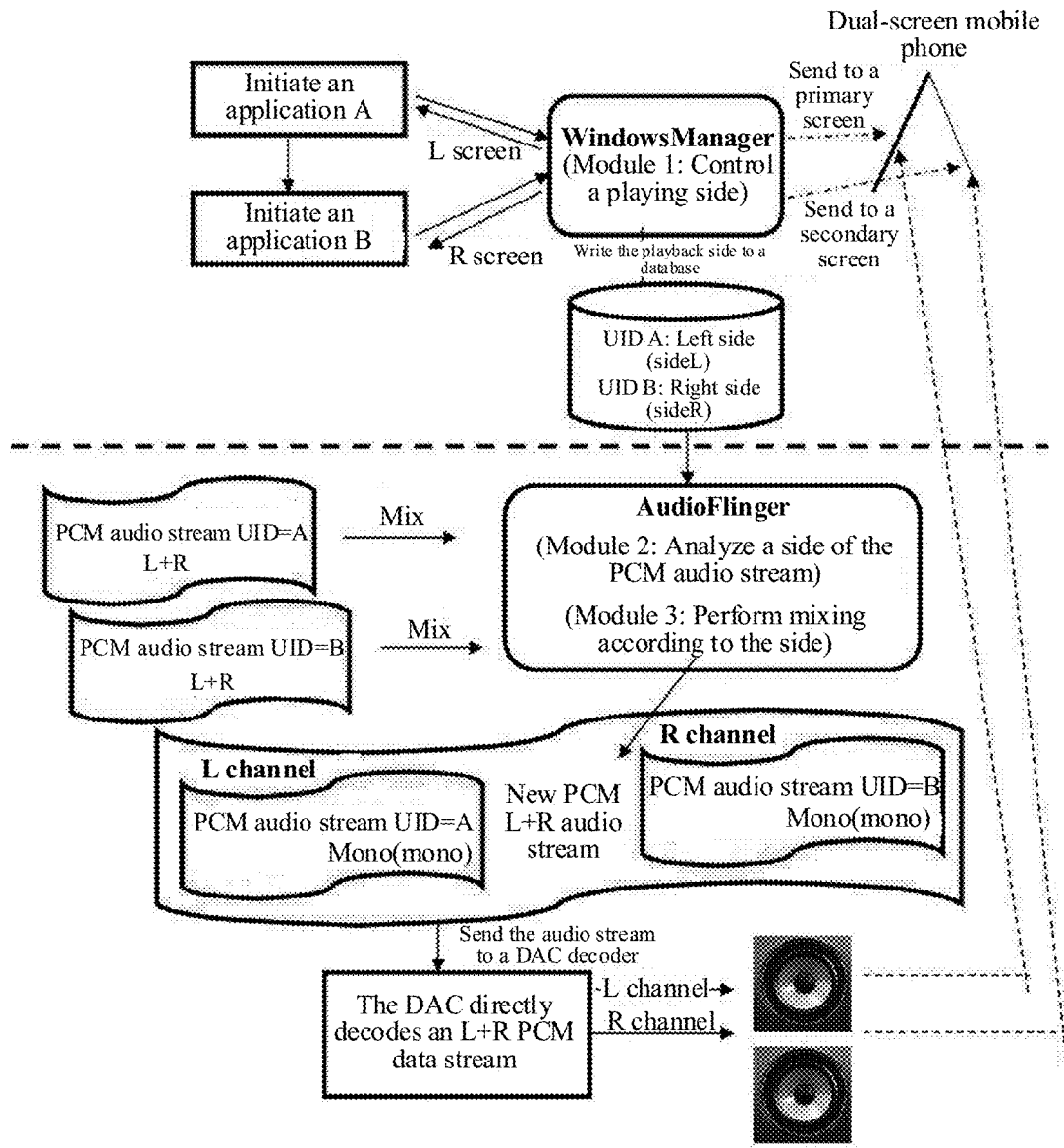
FIG. 4 is a schematic diagram of implementation of an audio playing method according to an embodiment of the present disclosure.

As shown in FIG. 4, FIG. 4 is a schematic diagram of an audio playing method according to an embodiment of the present disclosure. On a dual-screen smartphone, based on support of the Android WindowsManager, different applications may independently run on two screens, and different applications may be assigned by WindowsManager to specific screens for running. A screen on which the application is located may be switched. Each application initiated by a user may be operated on a screen where the application locates, and background applications are deployed through WindowsManager.

On an Android operating system, all applications have an ID, and the ID is called as UID. UID is an abbreviation of user ID. WindowsManager deploys applications based on the UID. Therefore, in a current embodiment, a screen on which an application is displayed is deployed using a UID.

A video playing control module is implemented in WindowsManager, and writes, to a database shown in FIG. 4 in real time, information indicating a screen on which the UID is currently located.

AudioFlinger in Android is a module responsible for combination of a plurality of pieces of audio. AudioFlinger can receive streams in PCM format from all applications. This PCM code stream includes audio data of stereo data of left and right (L/R) channels. Because Android phones generally have only one DAC, audio PCM stream data of a plurality of applications needs to be mixed by AudioFlinger to become one channel of PCM digital signal, then the PCM digital signal is sent to the DAC for decoding into an analog audio signal. Therefore, by default, AudioFlinger independently mixes audio streams of left and right channels of PCM streams of all applications that are playing audio to obtain new audio streams of left and right (L/R) channels.

Both an audio analysis module (2) and an audio processing module (3) of the present disclosure are implemented in AudioFlinger.

First, the audio analysis module may obtain UID information of audio data through AudioFlinger, and then search a database, according to the UID information, to select a screen for displaying an application corresponding to the UID.

Then the audio processing module pre-processes a PCM code stream of an audio stream corresponding to the UID at a left (L) side. The pre-processing is mainly to combine stereo PCM code streams into a mono code stream and encodes the mono code stream into a left channel of a new stereo PCM code stream. Similarly, if the audio stream corresponding to the UID needs to be played at a right (R) side, the stereo PCM code streams are combined into a mono code stream and then the mono code stream is placed in a right channel of the new stereo PCM code stream.

After all of the pre-processing is completed, when processed code streams of a plurality of applications are combined into a stereo PCM code stream, a sound of an application A is played in one channel, and a sound of an application B is played in the other channel.

When implementing the entire embodiment, two users can obtain sounds played by corresponding applications from the two sides of the mobile phone, respectively, and interference of accompanying sound of the opposite video is reduced.

Figure 5:
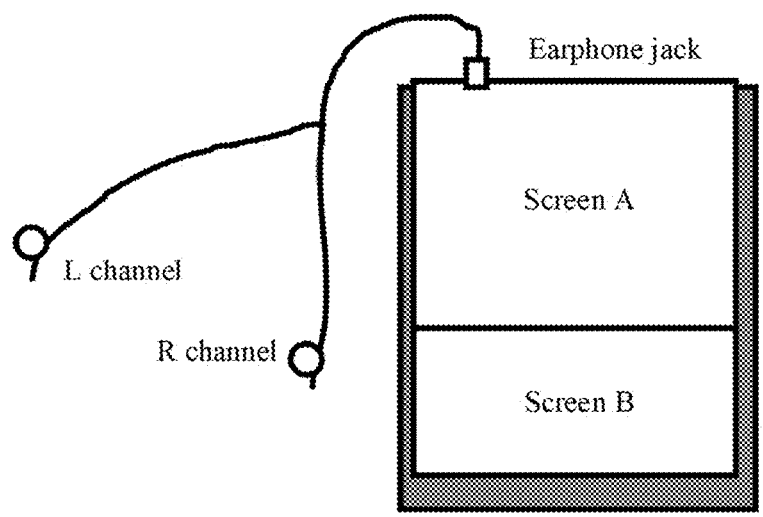
FIG. 5 is a schematic diagram of playing of two videos after split-screen display on a single screen.

In addition, the method of the present disclosure may also be applied to a scenario without two speakers on two screens, and the same effect may be achieved through earphones. After mixing by AudioFlinger, audio of left and right earphones are assigned to snap views of a split screen in a one-to-one correspondence. In the earphone scenario, the method of the present disclosure may also be used for a mobile phone that does not support dual screens but supports split screen. As shown in FIG. 5, after split-screen display of a single screen, two videos may be played on a large screen simultaneously, and sounds corresponding to the two videos may be played through the left and right earphones, respectively.

The above audio playing method is applied in a single DAC scheme. For an audio playing problem of a dual-screen mobile phone, there is a scheme of adding a complete set of speaker and DAC. In this scheme, two audio code streams may be separately played. However, in this scheme, DAC costs are increased, and existing hardware and software architectures also need to be changed, thereby not only increasing hardware costs, but also increasing costs and difficulty of software designing. According to the audio playing method provided in the embodiments of the present disclosure, two audio code streams can be played when the terminal has only a single DAC. Development and production costs are reduced and user experience is improved.

Figure 6:
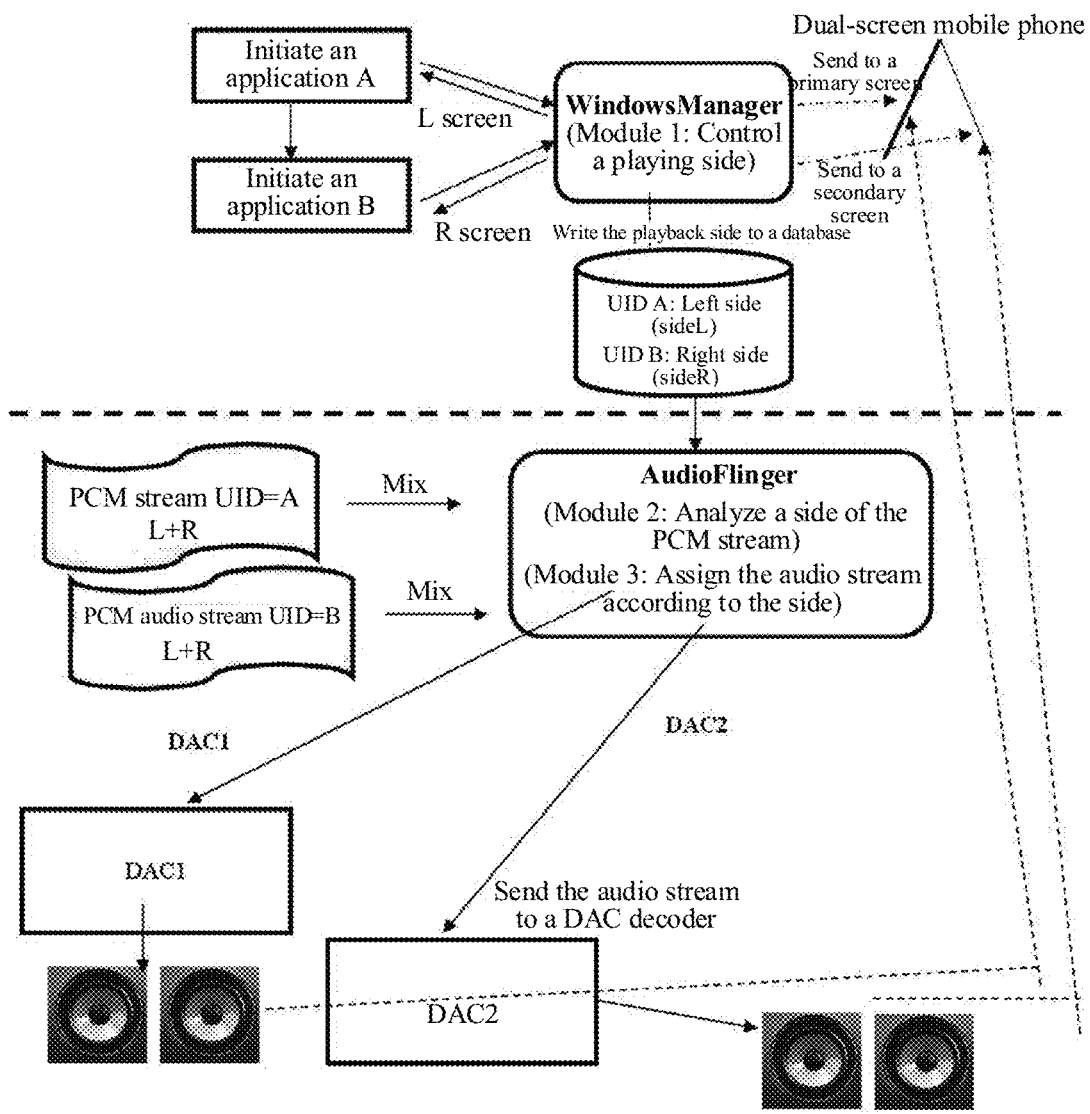
FIG. 6 is a schematic diagram of implementation of an audio playing method in a scenario of a plurality of audio channels according to an embodiment of the present disclosure.

In a single DAC scheme, each channel may support only one channel, and therefore a stereo effect becomes poorer, and the stereo effect is particularly affected in an earphone scheme. Therefore, a set of audio channels may be added, in hardware, to achieve high-end products. As shown in FIG. 6, in a device with a plurality of audio channels, a DAC selection may be performed in AudioFlinger. The DAC selection is related to DAC hardware and a hardware architecture at a specific side for playing. For example, if a corresponding speaker is on a left side, a PCM stream of an application on the left is assigned to a DAC corresponding to a left speaker for decoding. The same is true for a right side.

Figure 7:
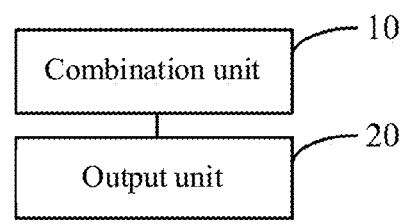
FIG. 7 is a schematic structural composition diagram of an audio playing apparatus according to an embodiment of the present disclosure.

Based on a concept same as or similar to a concept of the above embodiments, an embodiment of the present disclosure further provides an audio playing apparatus, disposed on a terminal. Referring to FIG. 7, the audio playing apparatus according to an embodiment of the present disclosure includes a combination unit 10 and an output unit 20.

The combination unit 10 is configured to obtain a combined third PCM code stream according to a first PCM code stream and a second PCM code stream. Herein information about the first PCM code stream and information about the second PCM code stream are carried in one of channels of the third PCM code stream, respectively.

The output unit 20 is configured to input the third PCM code stream to a DAC, and output the third PCM code stream to a first speaker and a second speaker through the DAC for playing.

In an embodiment of the present disclosure, the combination unit 10 obtaining the combined third PCM code stream according to the first PCM code stream and the second PCM code stream includes:

superposing left and right channels of the first PCM code stream to obtain first mono data, using the first mono data as a first channel of a first to-be-combined PCM code stream, and setting a second channel of the first to-be-combined PCM code stream to be empty;

superposing left and right channels of the second PCM code stream to obtain second mono data, using the second mono data as a second channel of a second to-be-combined PCM code stream, and setting a first channel of the second to-be-combined PCM code stream to be empty; and combining the first to-be-combined PCM code stream and the second to-be-combined PCM code stream; and obtaining the combined third PCM code stream.

In an embodiment of the present disclosure, the combination unit 10 obtaining the combined third PCM code stream according to the first PCM code stream and the second PCM code stream includes:

superposing left and right channels of the first PCM code stream to obtain first mono data, using the first mono data as a first channel of a first to-be-combined PCM code stream, obtaining corresponding second PCM code stream attenuation data according to the second PCM code stream, and using the second PCM code stream attenuation data as a second channel of the first to-be-combined PCM code stream;

superposing left and right channels of the second PCM code stream to obtain second mono data, and using the second mono data as a second channel of a second to-be-combined PCM code stream; obtaining corresponding first PCM code stream attenuation data according to the first PCM code stream, and using the first PCM code stream attenuation data as a first channel of the second to-be-combined PCM code stream; and combining the first to-be-combined PCM code stream and the second to-be-combined PCM code stream; and obtaining the combined third PCM code stream.

In an embodiment of the present disclosure, the combination unit 10 obtaining corresponding second PCM code stream attenuation data according to the second PCM code stream includes: rotating a data phase of the second PCM code stream by 180 degrees, and multiplying the data phase by a preset attenuation coefficient to obtain the second PCM code stream attenuation data.

The combination unit 10 obtaining corresponding first PCM code stream attenuation data according to the first PCM code stream includes: rotating a data phase of the first PCM code stream by 180 degrees, and multiplying the data phase by a preset attenuation coefficient to obtain the first PCM code stream attenuation data.

In an embodiment of the present disclosure, the combination unit 10 is further configured to determine, before obtaining the combined third PCM code stream according to the first PCM code stream and the second PCM code stream, that a first channel corresponding to the first PCM code stream is one of an L channel and an R channel, and determine that a second channel corresponding to the second PCM code stream is the other of the L channel and the R channel, to combine the first PCM code stream and the second PCM code stream according to the determined first and second channels.

In an embodiment of the present disclosure, the combination unit 10 determining that a first channel corresponding to the first PCM code stream is one of an L channel and an R channel and determining that a second channel corresponding to the second PCM code stream is the other of the L channel and the R channel includes:

finding out, according to an audio code stream, a UID of an application to which the f audio code stream belongs; wherein, the audio code stream may be the first PCM code stream or the second PCM code stream;

determining a corresponding playing screen according to the UID of the application;

determining, according to a correspondence between playing screens and speakers, a speaker corresponding to the audio code stream; and determining, according to a correspondence between speakers and channels, a channel corresponding to the audio code stream.

Based on a concept same as or similar to a concept of the above embodiments, an embodiment of the present disclosure further provides a terminal. The terminal includes a memory, a processor, and a computer program stored on the memory and executable on the processor. When the processor executes the computer program, processing of any of the above audio playing methods is implemented.

Based on a concept same as or similar to a concept of the above embodiments, an embodiment of the present disclosure further provides a terminal. The terminal includes any of the audio playing apparatuses according to the embodiments of the present disclosure.

It should be noted that, the embodiments described above are only for facilitating the understanding by those skilled in the art and are not intended to limit the protection scope of the present disclosure. Any obvious replacements and improvements made by those skilled in the art to the present disclosure without departing from the concept of the present disclosure shall fall within the protection scope of the present disclosure.

INDUSTRIAL APPLICABILITY

The present disclosure is applied to the technical field of intelligent terminals. According to the embodiments of the present disclosure, two audio code streams are combined into one audio code stream, and the information about the two audio code streams are carried in one of channels of the combined audio code stream respectively. Different channels of the combined audio code stream are played through different speakers, so that different users can hear accompanying sound of respective videos being watched by the users. The audio playing method is provided without changing an existing hardware structure, improving user experience, especially user experience of concurrent multimedia of a dual-screen mobile phone.

What is claimed is:

1. An audio playing method, comprising:
   obtaining a combined third pulse code modulation (PCM) code stream according to a first PCM code stream and a second PCM code stream, wherein information about the first PCM code stream and information about the second PCM code stream are carried in one of channels of the third PCM code stream, respectively; and
   inputting the third PCM code stream to a digital to analog converter (DAC), and outputting the third PCM code stream to a first speaker and a second speaker through the DAC for playing;
   wherein obtaining the combined third PCM code stream according to the first PCM code stream and the second PCM code stream comprises:
   superposing left and right channels of the first PCM code stream to obtain first mono data, using the first mono data as a first channel of a first to-be-combined PCM code stream, obtaining corresponding second PCM code stream attenuation data according to the second PCM code stream, and using the second PCM code stream attenuation data as a second channel of the first to-be-combined PCM code stream;
   superposing left and right channels of the second PCM code stream to obtain second mono data, and using the second mono data as a second channel of a second to-be-combined PCM code stream; obtaining corresponding first PCM code stream attenuation data according to the first PCM code stream, and using the first PCM code stream attenuation data as a first channel of the second to-be-combined PCM code stream; and
   combining the first to-be-combined PCM code stream and the second to-be-combined PCM code stream; and obtaining the combined third PCM code stream.

2. The audio playing method according to claim 1, wherein obtaining the combined third PCM code stream according to the first PCM code stream and the second PCM code stream comprises:
   superposing left and right channels of the first PCM code stream to obtain first mono data, using the first mono data as a first channel of a first to-be-combined PCM code stream, and setting a second channel of the first to-be-combined PCM code stream to be empty;
   superposing left and right channels of the second PCM code stream to obtain second mono data, using the second mono data as a second channel of a second to-be-combined PCM code stream, and setting a first channel of the second to-be-combined PCM code stream to be empty; and
   combining the first to-be-combined PCM code stream and the second to-be-combined PCM code stream; and obtaining the combined third PCM code stream.

3. The audio playing method according to claim 1, wherein
   obtaining corresponding second PCM code stream attenuation data according to the second PCM code stream comprises: rotating a data phase of the second PCM code stream by 180 degrees, and multiplying the data phase by a preset attenuation coefficient to obtain the second PCM code stream attenuation data; and
   obtaining corresponding first PCM code stream attenuation data according to the first PCM code stream comprises: rotating a data phase of the first PCM code stream by 180 degrees, and multiplying the data phase by a preset attenuation coefficient to obtain the first PCM code stream attenuation data.

4. The audio playing method according to claim 1, wherein before obtaining the combined third PCM code stream according to the first PCM code stream and the second PCM code stream, the method further comprises:
   determining that a first channel corresponding to the first PCM code stream is one of a left(L) channel and a right(R) channel, and determining that a second channel corresponding to the second PCM code stream is the other of the L channel and the R channel, to combine the first PCM code stream and the second PCM code stream according to the determined first and second channels.

5. The audio playing method according to claim 4, wherein determining that the first channel corresponding to the first PCM code stream is one of the L channel and the R channel and determining that a second channel corresponding to the second PCM code stream is the other of the L channel and the R channel comprises:
   finding out, according to an audio code stream, a UID of an application to which the audio code stream belongs; wherein the audio code stream is the first PCM code stream or the second PCM code stream;
   determining a corresponding playing screen according to the UID of the application;
   determining, according to a correspondence between playing screens and speakers, a speaker corresponding to the audio code stream; and
   determining, according to a correspondence between speakers and channels, a channel corresponding to the audio code stream.

6. An audio playing apparatus, disposed on a terminal, comprising:
   a processor, and
   a memory, communicably with the processor;
   wherein the memory stores instructions executable on the processor; when executed by the processor, the instructions cause the processor to perform a method comprising:
   obtaining a combined third pulse code modulation (PCM) code stream according to a first PCM code stream and a second PCM code stream, wherein information about the first PCM code stream and information about the second PCM code stream are carried in one of channels of the third PCM code stream, respectively; and
   inputting the third PCM code stream to a digital to analog converter (DAC), and outputting the third PCM code stream to a first speaker and a second speaker through the DAC for playing;
   wherein obtaining the combined third PCM code stream according to the first PCM code stream and the second PCM code stream comprises:
   superposing left and right channels of the first PCM code stream to obtain first mono data, using the first mono data as a first channel of a first to-be-combined PCM code stream, obtaining corresponding second PCM code stream attenuation data according to the second PCM code stream, and using the second PCM code stream attenuation data as a second channel of the first to-be-combined PCM code stream;

superposing left and right channels of the second PCM code stream to obtain second mono data, and using the second mono data as a second channel of a second to-be-combined PCM code stream; obtaining corresponding first PCM code stream attenuation data according to the first PCM code stream, and using the first PCM code stream attenuation data as a first channel of the second to-be-combined PCM code stream; and combining the first to-be-combined PCM code stream and the second to-be-combined PCM code stream; and obtaining the combined third PCM code stream.

7. The audio playing apparatus according to claim 6, wherein obtaining the combined third PCM code stream according to the first PCM code stream and the second PCM code stream comprises:

superposing left and right channels of the first PCM code stream to obtain first mono data, using the first mono data as a first channel of a first to-be-combined PCM code stream, and setting a second channel of the first to-be-combined PCM code stream to be empty;

superposing left and right channels of the second PCM code stream to obtain second mono data, using the second mono data as a second channel of a second to-be-combined PCM code stream, and setting a first channel of the second to-be-combined PCM code stream to be empty; and combining the first to-be-combined PCM code stream and the second to-be-combined PCM code stream; and obtaining the combined third PCM code stream.

8. The audio playing apparatus according to claim 6, wherein obtaining corresponding second PCM code stream attenuation data according to the second PCM code stream comprises: rotating a data phase of the second PCM code stream by 180 degrees, and multiplying the data phase by a preset attenuation coefficient to obtain the second PCM code stream attenuation data; and obtaining corresponding first PCM code stream attenuation data according to the first PCM code stream comprises: rotating a data phase of the first PCM code stream by 180 degrees, and multiplying the data phase by a preset attenuation coefficient to obtain the first PCM code stream attenuation data.

9. The audio playing apparatus according to claim 6, wherein before obtaining the combined third PCM code stream according to the first PCM code stream and the second PCM code stream, the method further comprises:

determining that a first channel corresponding to the first PCM code stream is one of a left(L) channel and a right(R) channel, and determining that a second channel corresponding to the second PCM code stream is the other of the L channel and the R channel, to combine the first PCM code stream and the second PCM code stream according to the determined first and second channels.

10. The audio playing apparatus according to claim 9, wherein determining that a first channel corresponding to the first PCM code stream is one of the L channel and the R channel and determining that a second channel corresponding to the second PCM code stream is the other of the L channel and the R channel comprises:

finding out, according to an audio code stream, a UID of an application to which the audio code stream belongs; wherein, the audio code stream is the first PCM code stream or the second PCM code stream;

determining a corresponding playing screen according to the UID of the application;

determining, according to a correspondence between playing screens and speakers, a speaker corresponding to the audio code stream; and determining, according to a correspondence between speakers and channels, a channel corresponding to the audio code stream.

11. A terminal, comprising a memory, a processor, and a computer program stored on the memory and executable on the processor, wherein when the processor executes the computer program, implements processing of a method comprising:

obtaining a combined third pulse code modulation (PCM) code stream according to a first PCM code stream and a second PCM code stream, wherein information about the first PCM code stream and information about the second PCM code stream are carried in one of channels of the third PCM code stream, respectively; and inputting the third PCM code stream to a digital to analog converter (DAC), and outputting the third PCM code stream to a first speaker and a second speaker through the DAC for playing;

wherein obtaining the combined third PCM code stream according to the first PCM code stream and the second PCM code stream comprises:

superposing left and right channels of the first PCM code stream to obtain first mono data, using the first mono data as a first channel of a first to-be-combined PCM code stream, obtaining corresponding second PCM code stream attenuation data according to the second PCM code stream, and using the second PCM code stream attenuation data as a second channel of the first to-be-combined PCM code stream;

superposing left and right channels of the second PCM code stream to obtain second mono data, and using the second mono data as a second channel of a second to-be-combined PCM code stream; obtaining corresponding first PCM code stream attenuation data according to the first PCM code stream, and using the first PCM code stream attenuation data as a first channel of the second to-be-combined PCM code stream; and combining the first to-be-combined PCM code stream and the second to-be-combined PCM code stream; and obtaining the combined third PCM code stream.

12. The terminal according to claim 11, wherein obtaining the combined third PCM code stream according to the first PCM code stream and the second PCM code stream comprises:

superposing left and right channels of the first PCM code stream to obtain first mono data, using the first mono data as a first channel of a first to-be-combined PCM code stream, and setting a second channel of the first to-be-combined PCM code stream to be empty;

superposing left and right channels of the second PCM code stream to obtain second mono data, using the second mono data as a second channel of a second to-be-combined PCM code stream, and setting a first channel of the second to-be-combined PCM code stream to be empty; and combining the first to-be-combined PCM code stream and the second to-be-combined PCM code stream; and obtaining the combined third PCM code stream.

13. The terminal according to claim 11, wherein obtaining corresponding second PCM code stream attenuation data according to the second PCM code stream comprises: rotating a data phase of the second PCM code stream by 180 degrees, and multiplying the data phase by a preset attenuation coefficient to obtain the second PCM code stream attenuation data; and obtaining corresponding first PCM code stream attenuation data according to the first PCM code stream comprises: rotating a data phase of the first PCM code stream by 180 degrees, and multiplying the data phase by a preset attenuation coefficient to obtain the first PCM code stream attenuation data.

14. The terminal according to claim 11, wherein before obtaining the combined third PCM code stream according to the first PCM code stream and the second PCM code stream, the method further comprises:

determining that a first channel corresponding to the first PCM code stream is one of a left(L) channel and a right(R) channel, and determining that a second channel corresponding to the second PCM code stream is the other of the L channel and the R channel, to combine the first PCM code stream and the second PCM code stream according to the determined first and second channels.

15. The terminal according to claim 14, wherein determining that the first channel corresponding to the first PCM code stream is one of the L channel and the R channel and determining that a second channel corresponding to the second PCM code stream is the other of the L channel and the R channel comprises:

finding out, according to an audio code stream, a UID of an application to which the audio code stream belongs; wherein the audio code stream is the first PCM code stream or the second PCM code stream;

determining a corresponding playing screen according to the UID of the application;

determining, according to a correspondence between playing screens and speakers, a speaker corresponding to the audio code stream; and determining, according to a correspondence between speakers and channels, a channel corresponding to the audio code stream.

* * * * *